United States Patent Office 2,917,635
Patented Dec. 15, 1959

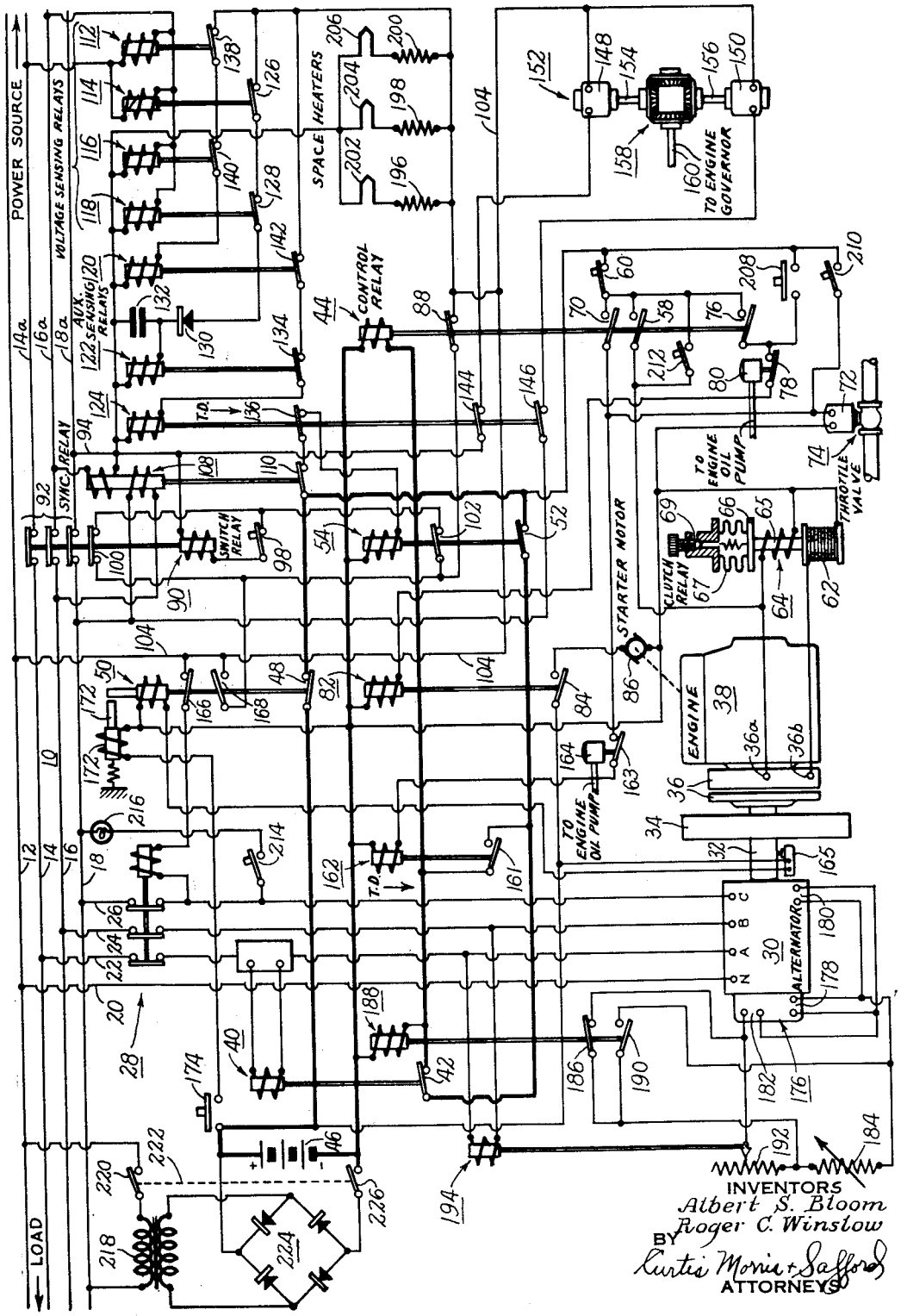

2,917,635

AUXILIARY POWER SYSTEM

Albert S. Bloom, Westbrookville, and Roger C. Winslow, Pound Ridge, N.Y., assignors to Consolidated Diesel Electric Corporation, Stamford, Conn.

Application March 20, 1957, Serial No. 647,362

18 Claims. (Cl. 290—30)

This invention relates to auxiliary power systems for electrical equipment. More particularly, this invention relates to such a system wherein auxiliary power is provided to the load immediately upon failure of the normal electrical supply source.

In many applications where electrical power is required to operate a load, it is particularly important that the supply of power not be interrupted under any circumstances. For example, the break-down of a radar station used to direct ground-controlled-approach landings of aircraft might under certain circumstances be disastrous. In the military field, where electrical equipment is used to direct the movements of aircraft or missiles moving faster than the speed of sound, an even momentary interruption in equipment operation obviously could have serious consequences. The problem is particularly acute where equipment is located remote from reliable sources of electric power, e.g. in the regions of the far north or other areas where the nearest organized community is a substantial distance away.

It has, of course, been a common practice to provide stand-by electrical generating sets which can be cut into the line upon failure of the normal commercial supply source. However, such arrangements generally require at least a short period of time after break-down before the stand-by equipment can be cut in. Furthermore, previous stand-by equipments have commonly required the attendance of operating personnel to take care of switching the stand-by equipment into operation or otherwise monitoring the switchover.

Accordingly, it is an object of this invention to provide an auxiliary power system that is superior to such systems used heretofore. It is a further object of this invention to provide such a system that is arranged to supply electrical power to a load automatically upon failure of the normal supply source, and wherein the transfer to the auxiliary power supply takes place without any substantial change in the voltage or frequency of electrical power fed to the load. Other objects, advantages and aspects of the present invention will be apparent from, or pointed out in, the following description of a preferred embodiment of the invention considered together with the accompanying drawing in which the single figure illustrates a schematic diagram of this embodiment.

Before proceeding with a description of this embodiment, it is desired to point out that all of the relays in the drawing are shown conditioned for normal operation, i.e. with the normal, or commercial, electrical supply source feeding power to the load.

There is shown extending across the top of the drawing a conventional three-phase transmission line 10 having four wires 12, 14, 16 and 18. At the upper left-hand corner of the drawing, these wires are connected to a load (not shown) which may for example be a radar installation. At the upper right-hand corner of the drawing, the wires are connected to a commercial power generating station (not shown), which feeds 3-phase electrical power through the transmission line to the load. In the embodiment shown herein, this electrical power is nominally 60 cycles, with a line-to-line potential of 208 volts.

Also connected to the transmission line 10 are four interconnecting leads 20, 22, 24 and 26 which extend down through the contacts of a circuit breaker 28 to four corresponding terminals of a synchronous alternator generally indicated at 30 near the lower left-hand corner of the drawing. This alternator has a rated capacity of 60 kilowatts, and its rotor shaft 32 is connected to a flywheel 34, e.g. 40 inches in diameter, 8 inches thick, and having a weight of 2300 pounds. As long as power is supplied to the transmission line by the normal supply source, the alternator operates as a motor to drive the flywheel at synchronous speed. Under these circumstances, the alternator may be adjusted to function as a synchronous condenser floating on the line to provide power-factor correction and to stabilize the voltage of the commercial power line.

Coupled to the flywheel 34 is a magnetic clutch 36 of conventional design and which, when the coil thereof is electrically energized, frictionally connects the flywheel to the crank-shaft of a diesel engine, generally indicated at 38, having a rated output of 90 horse-power. As long as the normal electrical supply source provides current of proper magnitude and frequency to the load, the diesel engine is stopped and the magnetic clutch 36 remains de-energized. However, upon failure of the normal supply source, the clutch is automatically energized to couple the flywheel to the engine shaft, and the engine is brought up to speed essentially by the inertial energy of the flywheel. The control arrangement for accomplishing this will now be described.

Coupled to one of the interconnecting leads 22 is a reverse power relay 40 which remains energized as long as power is being fed down from the transmission line 10 to the alternator 30. Upon failure of the normal supply source, the alternator ceases to function as a motor and, due to the kinetic energy provided by the flywheel 34, functions as a generator to feed power up the interconnecting leads 20, 22, 24 and 26 to the transmission line. The change in direction of current flow causes the reverse power relay to be de-energized, and the consequent opening of its contacts 42 breaks the energizing circuit (shown in the drawing with heavy lines) for a control relay generally indicated at 44.

This energizing circuit for the control relay 44 may be traced from the reverse power relay contacts 42 through the control relay winding to the negative terminal of a battery 46; and from the positive battery terminal through the contacts 48 of a lock-out relay 50, and through the contacts 52 of an auxiliary-synchronizing relay 54 back to the reverse power relay contacts. When this energizing circuit is interrupted, contacts 58 of the control relay close to apply power to the magnetic clutch 36. This clutch circuit may be traced from the positive terminal of the battery 46 through contacts 48 of the lock-out relay, through a selector switch 60 and contacts 58 of the control relay, through the operating coil (terminals 36a and 36b) of the magnetic clutch, and through a carbon-pile resistor 62 of a clutch relay 64 back to the negative terminal of the battery 46.

The winding of the clutch relay 64 also is energized at this time through the contacts 58 of the control relay 44. However, the clutch relay armature 65 is connected at its upper end to the movable plate 66 of a spring-loaded pneumatic bellows 67 the interior of which communicates with outside atmosphere through a small, adjustable restrictor vent 69. Consequently, the armature of this relay is slowly forced down against the carbon-pile resistor 62 and gradually decreases the electrical resistance of this pile so as to produce a smooth increase in current flow to the magnetic clutch 36. With this arrangement, the frictional engagement of the clutch is gradually increased, over a short period of time, from an initially low value up to the point where the clutch transmits torque directly from the flywheel 34 to the diesel engine 38. Accordingly, the flywheel is prevented from transmitting any sudden shocks to the crank-shaft of the engine.

De-energization of the control relay 44 also closes its contacts 70 to energize a throttle-valve solenoid 72 associated with the engine fuel pump diagrammatically indicated at 74 adjacent the lower edge of the drawing, and which when energized permits this pump to deliver fuel to the engine. This solenoid circuit may be traced from the left-hand side of the selector switch 60, through contacts 70 of the control relay, through the solenoid 72, and back to the negative terminal of the battery 46.

In order to break the static friction of the diesel engine 38 during the initial phases of its starting operation, the engine starter motor also is energized concurrently with the actuation of the magnetic clutch 36. For this purpose, a set of contacts 76 of the control relay 44 close to complete a circuit which can be traced from the left-hand side of the selector switch 60, through these contacts 76, through a starter cut-out switch 78, and through the winding of a starter relay generally indicated at 82 back to the negative terminal of the battery 46. Contacts 84 of the this relay 82 close to energize the starter motor 86 from the battery 46.

After the engine has accelerated for a short period of time, it is desirable to disengage the starter motor from the engine crank-shaft. This is accomplished by the starter cut-out switch 78 which, when operated, opens the energizing circuit of the starter relay 82. This cut-out switch includes an hydraulic actuating device 80 which communicates (by means not shown herein) with the oil lubrication system of the engine 38. When the engine has reached a predetermined speed, the engine oil pressure operates this device to open the cut-out switch contacts and thereby disengage the starter.

Accordingly, it will be apparent that the diesel engine 38 is accelerated by the flywheel 34, with the assistance of starter motor 86, and is rapidly brought up to operating speed. The engine thereupon drives the alternator 30 so as to continue to feed electrical power back along the interconnecting leads 20, 22, 24 and 26 to the transmission line 10. The engine also includes a governor (not shown) arranged to normally maintain an alternator output frequency of 60 cycles per second.

Since the electric power generated by the alternator 30 should not be fed back along the transmission line 10 to the normal supply source, provision also is made for disconnecting the normal supply source from the transmission line whenever the auxiliary power system is activated. For this purpose, contacts 88 of the control relay 44 open to de-energize a switch relay 90 (see the upper central portion of the drawing) the normally closed contacts 92 of which are connected in series with the transmission wires 14, 16 and 18. The energizing circuit for this switch relay may be traced from the transmission wire 18a (on the right-hand side of the contacts 92) down a lead 94 through the switch relay winding, through a selector switch 98, through either contacts 100 of the switch relay 90 or contacts 102 of the auxiliary synchronizing relay 54, through contacts 88 of the control relay, and through a lead 104 back to the neutral transmission wire 12.

The resultant loss of voltage on the transmission wires 16a and 18a de-energizes a synchronizing relay 108 one winding of which is connected across these wires. Contacts 110 of the synchronizing relay consequently open to interrupt the energizing circuit for the auxiliary-synchronizing relay 54. De-energization of this latter relay opens its contacts 52 and 102 which are in series with the energizing circuits for the control relay 44 and the switch relay 90, respectively. Accordingly, these two relays cannot be re-energized until the normal electrical supply source again delivers alternating current to the transmission wires 12, 14a, 16a and 18a. Furthermore, as will be explained, this alternating current must be matched to the output of the alternator 30 before the load can be switched back to the normal supply source.

Referring now to the upper right-hand portion of the drawing, there is shown a group of four voltage-sensing relays 112, 114, 116 and 118, a pair of auxiliary sensing relays 120 and 122, and a time-delay relay 124, all of which are energized by the voltage across the transmission wires 10 when the load is being carried by the normal supply source. These relays serve to activate the auxiliary power system in the event that the line-to-line potentials of the transmission system deviate any considerable amount from the nominal 208 volts ordinarily delivered by the normal supply source.

For this purpose, the voltage-sensing relays 114 and 118 are arranged to drop out when the line-to-line potential goes down to 200 volts. When either of these relays drops out, the contacts 126 or 128 thereof open to interrupt the energizing circuit for the first auxiliary-sensing relay 122. This energizing circuit includes a rectifier 130 and a capacitor 132 to produce a delay, e.g. about 2 seconds, in drop-out of the relay 122 so that the auxiliary power control system will not be activated by momentary line voltage fluctuations.

When the relay 122 drops out, the contacts 134 thereof open to interrupt the energizing circuit for the time-delay relay 124, and its contacts 136 thereupon open to interrupt the energizing circuit for the auxiliary-synchronizing relay 54. Accordingly, the contacts 52 of this latter relay open to de-energize the control relay 44 which, as explained hereinabove, brings the auxiliary power system into operation and opens the switch relay 90 to disconnect the normal electrical supply source from the transmission line 10.

Returning again to the condition of operation from the normal supply source, the other two voltage-sensing relays 112 and 116 are arranged to drop out when the line-to-line potential goes down to 195 volts. Drop out of either of these relays opens the contacts 138 or 140 thereof to interrupt the energizing circuit for the second auxiliary-sensing relay 120. De-energization of this latter relay opens its contacts 142 immediately to break the energizing circuit for the time-delay relay 124 and accordingly the auxiliary power system is brought into operation as explained above.

It will be apparent that when the auxiliary power system is activated by operation of the reverse power relay 40 (as explained previously hereinabove), the subsequent opening of the switch relay 90 will de-energize all of the relays 112, 114, 116, 118, 120, 122, and 124.

Once the auxiliary power system has been activated, it will continue to supply the electrical power requirements of the load until the normal electrical supply source again feeds power of proper amplitude and frequency to the transmission wires 12, 14a, 16a and 18a. When the normal supply source comes back on the line, the auxiliary power system is automatically switched out of operation in the following manner.

Assuming that the line-to-line voltage provided by the normal supply source is of the proper amplitude, the four voltage-sensing relays 112, 114, 116 and 118 will be energized and their contacts 126, 128, 138 and 140 will close to energize the two auxiliary-sensing relays 120 and 122. When the auxiliary-sensing relays 120 and 122 have pulled in, their contacts 134 and 142 close to energize the time-delay relay 124. The latter relay is arranged so that its contacts 144 and 146 close a predetermined time after the relay winding has been energized, e.g. about 30 minutes, as by means of a conventional clock-work drive mechanism (not shown). This delayed action is provided to assure that the auxiliary power system will not be de-activated until the normal electrical supply source has been operating stably for a reasonable period of time.

Closure of time-delay relay contacts 144 and 146 energizes a pair of synchronous motors 148 and 150 which form part of an engine speed control mechanism generally indicated at 152. One of these motors 148 is energized by the normal supply source and accordingly its shaft 154 rotates at a speed proportional to the frequency of this source. The other motor 150 is energized by the output of the alternator 30 and accordingly its shaft 156 rotates at a speed proportional to the alternator output frequency. The two motor shafts are connected to a bevel-gear differential diagrammatically indicated at 158, and having an output shaft 160 which is connected (by conventional means not shown) to the governor of the diesel engine 38. When there is a difference between the frequencies of the normal supply source and the alternator 30, the two synchronous motors will rotate at different speeds and thus produce a rotation of the output shaft 160 which, in turn, adjusts the engine governor in the correct direction to make the alternator frequency equal to that of the normal supply source. When these frequencies are equal, of course, there will be no more movement of the differential output shaft and the system is ready for switch-over.

Under normal circumstances, this speed-synchronizing process will be completed well within 30 minutes. Accordingly, the time-delay relay 124 is arranged (as by conventional clock-work means, not shown) so that its contacts 136 close about 30 minutes after closure of contacts 144 and 146. Closure of contacts 136 partially completes the energizing circuit for the auxiliary synchronizing relay 54 so as to condition this relay for operation when phase synchronism has been achieved.

To assure that the outputs of the alternator 30 and the normal supply source are substantially in phase at the instant the normal supply source is cut back onto the line, de-activation of the auxiliary power system is controlled by the synchronizing relay 108. This relay includes a pair of windings one of which is connected to the transmission wires 16 and 18 and the other of which is connected to the transmission wires 16a and 18a, and the relay is arranged such that it is automatically actuated when the voltages fed to its two separate windings are in phase and approximately equal in amplitude. When so actuated, its contacts 110 close and, in conjunction with the closed contacts 136 of the time-delay relay 124, complete the energizing circuit for the auxiliary-synchronizing relay 54.

Contacts 52 of this latter relay 54 close and complete an energizing circuit for the control relay 44, this circuit passing through contacts 161 (which are closed at this time) of a delayed drop-out relay 162. This relay is energized through contacts 70 of the control relay 44 and through contacts 163 of a hydraulic actuating device 164 controlled by the oil pressure of the diesel engine 38. Contacts 163 are closed by this device when the engine reaches operating speed. During the cycle of operations after a commercial power failure, relay 162 is energized after the auxiliary synchronizing relay contacts 52 open, which assures that the control relay energizing circuit cannot be completed by contacts 161 immediately after the reverse power relay contacts are opened.

Returning now to the sequence of operations involved in de-activating the auxiliary power system, energization of the control relay 44 also closes its contacts 88 which, in conjunction with the closed contacts 102 of the auxiliary-synchronizing relay 54, completes the energizing circuit for the switch relay 90. Accordingly, the contacts 92 of this latter relay close and connect the normal electrical supply source to the transmission line 10. In addition, hold-in contacts 100 of this latter relay close to complete a circuit in parallel with contacts 102 of the relay 54.

With commercial power thus applied to the transmission line 10, the alternator 30 reverts to functioning as a motor, and the flow of current to the alternator energizes the reverse power relay 40 to close its contacts 42. Also, during this transition period, opening of contacts 70 of the control relay 44 de-energizes the delayed drop-out relay 162. The contacts 161 of this relay, however, stay closed for about 20 seconds, as by means of a pneumatic relay control arrangement such as described with reference to the clutch relay 64.

This delay feature is provided because there is a tendency for the flywheel 34 to "surge" (i.e. vary in speed) for a short time interval after the alternator has been connected back to the normal supply source, apparently due to inertial effects. Consequently, the current flowing through lead 22 may reverse direction several times during this time interval and cause the reverse power relay to operate intermittently. By holding the relay contacts 161 closed during this period, the control relay 44 will remain energized and the transition from auxiliary power to commercial power will take place smoothly.

Means also are provided to disconnect the auxiliary power control equipment from the transmission line 10 in the event of failure of the support bearings for the alternator shaft 32. For this purpose, immediately adjacent this shaft there is mounted a pressure-sensitive switch 165 (e.g. a microswitch) the contacts of which are closed by any lateral motion of the shaft greater than .005″. When these contacts are closed, an energizing circuit is completed between the battery 46 and the winding of the lock-out relay 50. Energization of this relay opens its contacts 48 to break the energizing circuit for the magnetic clutch 36 and the various other control elements associated with the engine 38, so that the auxiliary power supply cannot be activated. Contacts 166 of the lock-out relay open to de-energize the circuit breaker 28, the contacts of which open to disconnect the alternator from the transmission line. Also, contacts 168 of this relay close to complete a parallel path around contacts 88 of the control relay 44, so that the switch relay 90 will remain energized after the control relay has dropped out due to opening of contacts 48.

The armature of the lock-out relay 50 is provided with a spring-loaded latching device, diagrammatically indicated at 170, which holds this armature in actuated condition once the relay has been energized. After the bearing failure has been corrected, the lock-out relay armature may be released by operation of a reset relay 172 which is energized by depressing a push-button switch 174. Retraction of the reset relay armature disengages the latching device and permits the lock-out relay armature to return to its de-actuated condition.

The alternator 30 is provided with a conventional exciter diagrammatically indicated at 176. The armature terminals 178 of this exciter are connected in the usual way directly to the field winding terminals 180 of the alternator. When the system is operating on commercial power (as shown), the exciter armature terminals are connected to the exciter field terminals 182 through a manually-operable rheostat 184, the circuit passing through contacts 186 of a transfer relay 188. Thus the field excitation can be adjusted to desired operating conditions.

The transfer relay 188 is connected in parallel with the control relay 44 so that, when the auxiliary power system is activated, the transfer relay is deenergized and its contacts 190 close to short out the rheostat 184. At the same time, its contacts 186 open to place in series with the exciter field circuit an automatically-controlled variable resistor 192 operated by a voltage-regulator 194. The regulator is energized from power leads 22 and 24, and serves to automatically adjust the exciter field current so as to maintain the alternator output voltage substantially constant at a preselected value.

To assure stable operation of the auxiliary power system under varying ambient conditions, means are provided for maintaining the engine lubricant, the engine coolant, and the various control components at predetermined temperatures. For this purpose (referring now to the right-hand central portion of the drawing), there is provided a lubricating oil heater element 196, a coolant heater element 198, and a control cubicle heater element 200. The first heater element 196 is physically positioned in the engine lubricating passages, and the second heater element 198 is positioned in the engine coolant passages. The third heater element 200 is mounted within a control cubicle (not shown) which forms a complete enclosure about all of the various control components (relays, etc.) described in this specification. Each of these heater elements is connected in series with a corresponding thermostatically-controlled switch 202, 204 and 206 arranged to pass electric current through the respective heater elements if the temperature of the controlled space drops below a predetermined set value, e.g. the highest ambient temperature expected for the auxiliary power system installation.

Certain manual controls also are provided for the auxiliary power system described. Referring to the lower right-hand portion of the drawing, there is shown a push-button operated start switch 208 which is arranged to energize the starter relay 82 to operate the starter motor 86, e.g. for test purposes. Below this start switch there is shown a fuel-pump switch 210 which, when operated, by-passes the open contacts 70 of the control relay 44 and energizes the throttle-valve solenoid 72. Above and to the left of the start switch there is a clutch switch 212 which, when operated, energizes the magnetic clutch 36 independently of the control relay 44.

Connected across one set of contacts of the circuit breaker 28 is a synchronizing switch 214 in series with a lamp 216. When the circuit breaker is open, closure of the synchronizing switch permits the lamp to be used as an indicator of phase synchronism between the output of the alternator 30 and the voltage on the transmission line 10, so that the circuit breaker may be closed manually when synchronization has been achieved.

The battery 46 is provided with a charging circuit which includes a transformer 218 having its primary winding energized from the transmission line 10 through the contacts 220 of an on-off switch 222. The transformer secondary is connected across a rectifier bridge 224, the direct-current output of which is fed through another set of contacts 226 of the on-off switch 222 to the battery terminals.

Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as meet the requirements of particular applications, it being understood that various modifications may be made without departing from the scope of the invention as limited by the prior art.

We claim:

1. An auxiliary power system adapted to supply electrical current to a load upon failure of the normal power supply source, comprising, in combination, an alternator, circuit means arranged to connect said alternator to a transmission line carrying alternating current from the normal supply source to a load, said alternator being arranged to function as a motor when said transmission line is supplied with alternating-current power from the normal supply source and arranged to function as a generator to supply current to said transmission line upon cessation of power from said supply source, a flywheel connected to said alternator and rotatable therewith, a source of motive power normally in de-activated condition, a clutch having frictionally-engageable members for connecting said flywheel to said source of motive power, clutch-actuating means for said clutch and arranged when operated to gradually increase the pressure of engagement between said clutch members over a short period of time, and control means responsive to the flow of electrical power from said supply source and arranged to operate said clutch-actuating means upon cessation of said flow of electrical power, said source of motive power being accelerated by the stored-up energy of said flywheel until operating speed is reached whereupon said source of motive power drives said alternator to supply current to said transmission line.

2. An auxiliary power system adapted to supply electrical current to a load upon failure of the normal power supply source, comprising, in combination, a synchronous alternator, circuit means arranged to connect said alternator to a transmission line carrying alternating current from the normal supply source to a load, said alternator being arranged to function as a motor when said transmission line is supplied with altenating-current power from the normal supply source and arranged to function as a generator to supply current to said transmission line upon cessation of power from said supply source, a flywheel connected to said alternator and rotatable therewith, a source of motive power normally in de-activated condition, clutch means for connecting said flywheel to said source of motive power, and control means responsive to the flow of electrical power between said transmission line and said alternator and arranged to actuate said clutch means when the direction of said flow of electrical power is from said alternator to said transmission line, said source of motive power thereby being accelerated by the stored-up energy of said flywheel until operating speed is reached whereupon said source of motive power drives said alternator to supply current to said transmission line.

3. An auxiliary power system adapted to supply electrical current to a load upon failure of the normal power supply source, comprising, in combination, an alternator, circuit means arranged to connect said alternator to a transmission line carrying alternating current from the normal supply source to a load, said alternator being arranged to function as a motor when said transmission line is supplied with alternating-current power from the normal supply source and arranged to function as a generator to supply current to said transmission line upon cessation of power from said supply source, a shaft for said alternator, a flywheel connected to said alternator shaft and rotatable therewith, a source of motive power normally in de-activated condition, clutch means for connecting said flywheel to said source of motive power, control means responsive to the flow of electrical power from said supply source and arranged to actuate said clutch means upon cessation of said flow of electrical power, said source of motive power being accelerated by the stored-up energy of said flywheel until operating speed is reached whereupon said source of motive power drives said alternator to supply current to said transmission line, and sensing means adjacent said alternator shaft and responsive to slight lateral movement thereof, said sensing means being arranged to de-activate said auxiliary power system when said shaft moves laterally more than a predetermined small amount.

4. An auxiliary power system adapted to supply electrical current to a load upon failure of the normal electrical power supply source, comprising, in combination, an alternator, circuit means arranged to connect said alternator to a transmission line carrying alternating current from the normal electrical supply source to a load, said alternator being arranged to function as a motor when said transmission line is supplied with alternating-current power from the normal supply source and arranged to function as a generator to supply current to said transmission line upon cessation of power from said supply source, switch means arranged when actuated to disconnect said supply source from said transmission line, a flywheel connected to said alternator and rotatable therewith, a source of motive power normally in de-activated condition, clutch means for connecting said flywheel to said source of motive power, control means responsive to the flow of electrical power from said supply source and arranged to actuate said clutch means and said switch means upon failure of said electrical supply source, said source of motive power being accelerated by the stored-up energy of said flywheel until operating speed is reached whereupon said source of motive power drives said alternator to supply current to said transmission line, and signal-sensing means responsive to the outputs of said supply source and said alternator, said sensing means being arranged to de-actuate said clutch means and said switch means when said outputs are substantially matched.

5. An auxiliary power system adapted to supply electrical current to a load upon failure of the normal power supply source, comprising, in combination, an alternator, circuit means arranged to connect said alternator to a transmission line carrying alternating current from the normal supply source to a load, said alternator being arranged to function as a motor when said transmission line is supplied with alternating-current power from the normal supply source and arranged to function as a generator to supply current to said transmission line upon cessation of power from said supply source, a flywheel connected to said alternator and rotatable therewith, an internal combustion engine normally in de-activated condition, a starting motor for said engine, clutch means having frictionally-engageable members for connecting said flywheel to said engine, and control means responsive to the flow of electrical power from said supply source and arranged to energize said starting motor upon cessation of said flow of electrical power, said control means being arranged simultaneously to gradually increase the pressure of engagement between said clutch members over a short period of time to permit said starting motor to operate said engine a small amount before the energy of said flywheel is directly coupled through said clutch means to said engine, said engine being accelerated by the stored-up energy of said flywheel and said engine being arranged when starting speed is reached to drive said alternator to supply current to said transmission line.

6. An auxiliary power system adapted to supply electrical current to a load upon failure of the normal power supply source, comprising, in combination, an alternator, circuit means arranged to connect said alternator to a transmission line carrying alternating current from the normal supply source to a load, said alternator being arranged to function as a motor when said transmission line is supplied with alternating-current power from the normal supply source and arranged to function as a generator to supply current to said transmission line upon cessation of power from said supply source, a flywheel connected to said alternator and rotatable therewith, a source of motive power normally in de-activated condition, an electrically-operated clutch for connecting said flywheel to said source of motive power, a clutch-actuating circuit for said clutch and arranged when operated to feed gradually-increasing amounts of current to said clutch over a short period of time, whereby said clutch is gradually engaged to transfer energy from said flywheel to said source of motive power without sudden shock, and control means responsive to the flow of electrical power from said supply source and arranged to operate said clutch-actuating circuit upon cessation of said flow of electrical power, said source of motive power being accelerated by the stored-up energy of said flywheel until operating speed is reached whereupon said source of motive power drives said alternator to supply current to said transmission line.

7. An auxiliary power system adapted to supply electrical current to a load upon failure of the normal power supply source, comprising, in combination, a synchronous alternator, circuit means arranged to connect said alternator to a transmission line carrying alternating current from the normal supply source to a load, said alternator being arranged to function as a motor when said transmission line is supplied with alternating-current power from the normal supply source and arranged to function as a generator to supply current to said transmission line upon cessation of power from said supply source, a flywheel connected to said alternator and rotatable therewith, a diesel engine normally in de-activated condition, a fuel-control mechanism for said engine, clutch means for connecting said flywheel to said engine, and a reverse power relay responsive to the flow of electrical power between said transmission line and said alternator and arranged to actuate said clutch means and said fuel-control mechanism when the direction of said flow of electrical power is from said alternator to said transmission line, said engine thereby being accelerated by the stored-up energy of said flywheel until starting speed is reached whereupon said engine drives said alternator to supply current to said transmission line.

8. An auxiliary power system adapted to supply electrical current to a load upon failure of the normal power supply source, comprising, in combination, an alternator, circuit means arranged to connect said alternator to a transmission line carrying alternating current from the normal supply source to a load, said alternator being arranged to function as a motor when said transmission line is supplied with alternating-current power from the normal supply source and arranged to function as a generator to supply current to said transmission line upon cessation of power from said supply source, switch means arranged when actuated to disconnect said transmission line from said normal supply source, a flywheel connected to said alternator and rotatable therewith, a source of motive power normally in de-activated condition, clutch means for connecting said flywheel to said source of motive power, control means responsive to the flow of electrical power from said supply source and arranged to actuate said clutch means and said switch means upon cessation of said flow of electrical power, said source of motive power being accelerated by the stored-up energy of said flywheel until operating speed is reached whereupon said source of motive power drives said alternator to supply current to said transmission line, and speed adjusting means coupled to said normal supply source and responsive to the frequency of alternating current produced thereby, said adjusting means being arranged to vary the speed of said source of motive power so as to tend to synchronize the outputs of said alternator and said supply source prior to deactuating said switch means.

9. An auxiliary power system adapted to supply electrical current to a load upon failure of the normal power supply source, comprising, in combination, an alternator, circuit means arranged to connect said alternator to a transmission line carrying alternating current from the normal electrical supply source to a load, said alternator being arranged to function as a motor when said transmission line is supplied with alternating-current power from the normal supply source and arranged to function as a generator to supply current to said transmission line upon cessation of power from said supply source, switch means arranged when actuated to disconnect said supply source from said transmission line, a flywheel connected to said alternator and rotatable therewith, a source of motive power normally in de-activated condition, clutch means for connecting said flywheel to said source of motive power, control means responsive to the flow of electrical power from said supply source and arranged to actuate said clutch means and said switch means upon failure of said electrical supply source, said source of motive power being accelerated by the stored-up energy of said flywheel until operating speed is reached whereupon said source of motive power drives said alternator to supply current to said transmission line, and signal-sensing means including phase-sensitive and voltage-responsive relay means coupled to the outputs of said alternator and said supply source, said sensing means being arranged to deactuate said clutch means and said switch means when the voltages of said outputs are substantially matched.

10. An auxiliary power system adapted to supply electrical current to a load upon failure of the normal power supply source, comprising, in combination, an alternator, circuit means arranged to connect said alternator to a transmission line carrying alternating current from the normal electrical supply source to a load, said alternator being arranged to function as a motor when said transmission line is supplied with alternating-current power from the normal supply source and arranged to function as a generator to supply current to said transmission line upon cessation of power from said supply source, switch means arranged when actuated to disconnect said supply source from said transmission line, a flywheel connected to said alternator and rotatable therewith, a source of motive power normally in de-activated condition, clutch means for connecting said flywheel to said source of motive power, control means responsive to the flow of electrical power from said supply source and arranged to actuate said clutch means and said switch means upon failure of said electrical supply source, said source of motive power being accelerated by the stored-up energy of said flywheel until operating speed is reached whereupon said source of motive power drives said alternator to supply current to said transmission line, signal-sensing means responsive to the output of said supply source, said sensing means being arranged to condition said clutch means and said switch means for de-actuation, and time delay means for said signal-sensing means to produce a predetermined time delay between the energization of said signal-sensing means and the deactuation of said clutch means and said switch means.

11. An auxiliary power system adapted to supply electrical current to a load upon failure of the normal power supply source, comprising, in combination, an alternator, circuit means arranged to connect said alternator to a transmission line carrying alternating current from the normal supply source to a load, said alternator being arranged to function as a motor when said transmission line is supplied with alternating-current power from the normal supply source and arranged to function as a generator to supply current to said transmission line upon cessation of power from said supply source, a flywheel connected to said alternator and rotatable therewith, an engine normally in de-activated condition, clutch means for connecting said flywheel to said engine, control means responsive to the flow of electrical power from said supply source and arranged to actuate said clutch means upon cessation of said flow of electrical power, said control means including a relay having a set of contacts operable when said flow of power ceases to activate an energizing circuit for said clutch means, said engine being accelerated by the stored-up energy of said flywheel and arranged when starting speed is reached to drive said alternator to supply current to said transmission line, and switch means connected in parallel with said relay contacts and actuable when said engine is operating to by-pass said contacts and condition said energizing circuit for deactivation when the normal supply source again feeds power to said transmission line.

12. An auxiliary power system adapted to supply electrical current to a load upon failure of the normal power supply source, comprising, in combination, an alternator, circuit means arranged to connect said alternator to a transmission line carrying alternating current from the normal supply source to a load, said alternator being arranged to function as a motor when said transmission line is supplied with alternating-current power from the normal supply source and arranged to function as a generator to supply current to said transmission line upon cessation of power from said supply source, a flywheel connected to said alternator and rotatable therewith, a source of motive power normally in deactivated condition, an electrically-operated clutch for connecting said flywheel to said source of motive power, a clutch-actuating circuit for said clutch and arranged when operated to feed gradually-increasing amounts of current to said clutch over a short period of time, whereby said clutch is gradually engaged to transfer energy from said flywheel to said source of motive power without sudden shock, said circuit including a variable resistor having an operating mechanism connected thereto for slowly changing the ohmic resistance of said resistor over a predetermined period of time, control means responsive to the flow of electrical power from said supply source and arranged to energize said clutch-actuating circuit upon cessation of said flow of electrical power, said source of motive power being accelerated by the stored-up energy of said flywheel until operating speed is reached whereupon said source of motive power drives said alternator to supply current to said transmission line.

13. An auxiliary power system adapted to supply electrical current to a load upon failure of the normal power supply source, comprising, in combination, an alternator, circuit means arranged to connect said alternator to a transmission line carrying alternating current from the normal supply source to a load, said alternator being arranged to function as a motor when said transmission line is supplied with alternating-current power from the normal supply source and arranged to function as a generator to supply current to said transmission line upon cessation of power from said supply source, a flywheel connected to said alternator and rotatable therewith, a source of motive power normally in deactivated condition, an electrically-operated clutch for connecting said flywheel to said source of motive power, a clutch-actuating circuit for said clutch and arranged when operated to feed gradually-increasing amounts of current to said clutch over a short period of time, a carbon-pile resistor for said clutch-actuating circuit, a relay having its armature in contact with said resistor and arranged when energized to apply pressure thereto to decrease the resistance of said resistor, a pneumatic bellows connected to said armature to restrain the movement thereof against said resistor, a vent for said bellows to permit said armature to move slowly against said resistor to gradually increase the current fed to said clutch over said short period of time, whereby said clutch is gradually engaged to transfer energy from said flywheel to said source of motive power without sudden shock, and control means responsive to the flow of electrical power from said supply source and arranged to energize said clutch-actuating circuit upon cessation of said flow of electrical power, said source of motive power being accelerated by the stored-up energy of said flywheel until operating speed is reached whereupon said source of motive power drives said alternator to supply current to said transmission line.

14. An auxiliary power system adapted to supply electrical current to a load upon failure of the normal power supply source, comprising, in combination, an alternator, circuit means arranged to connect said alternator to a transmission line carrying alternating current from the normal supply source to a load, said alternator being arranged to function as a motor when said transmission line is supplied with alternating-current power from the normal supply source and arranged to function as a generator to supply current to said transmission line upon cessation of power from said supply source, a flywheel connected to said alternator and rotatable therewith, a source of motive power normally in de-activated condition, a starting mechanism for said source of motive power, an electrically-operated clutch for connecting said flywheel to said source of motive power, a clutch actuating circuit for said clutch and arranged when operated to feed gradually-increasing amounts of current to said clutch over a short period of time, and control means responsive to the flow of electrical power from said supply source and arranged to operate said clutch actuating circuit and to energize said starting mechanism upon cessation of said flow of electrical power, said source of motive power being accelerated by the stored-up energy of said flywheel and the output of said starting mechanism and said source of motive power being arranged when operating speed is reached to drive said alternator to supply current to said transmission line.

15. An auxiliary power system adapted to supply electrical current to a load upon failure of the normal power supply source, comprising, in combination, an alternator, circuit means arranged to connect said alternator to a transmission line carrying alternating current from the normal supply source to a load, said alternator being arranged to function as a motor when said transmission line is supplied with alternating-current power from the normal supply source and arranged to function as a generator to supply current to said transmission line upon cessation of power from said supply source, a flywheel connected to said alternator and rotatable therewith, an engine normally in de-activated condition, clutch means for connecting said flywheel to said engine, control means responsive to the flow of electrical power from said supply source and arranged to actuate said clutch means upon cessation of said flow of electrical power, said control means including a relay having a set of contacts operable when said flow of power ceases to activate an energizing circuit for said clutch means, said engine being accelerated by the stored-up energy of said flywheel and arranged when starting speed is reached to drive said alternator to supply current to said transmission line, switch means connected in parallel with said relay contacts and actuable when said engine is operating to by-pass said contacts and condition said energizing circuit for deactivation when the normal supply source again feeds power to said transmission line, and time-delay means for maintaining said switch means closed to by-pass said contacts for a short period of time after said normal supply source again feeds power to said transmission line.

16. An auxiliary power system adapted to supply electrical current to a load upon failure of the normal power supply source, comprising, in combination, an alternator, circuit means arranged to connect said alternator to a transmission line carrying alternating current from the normal supply source to a load, said alternator being arranged to function as a motor when said transmission line is supplied with alternating-current power from the normal supply source and arranged to function as a generator to supply current to said transmission line upon cessation of power from said supply source, switch means arranged when actuated to disconnect said transmission line from said normal supply source, a flywheel connected to said alternator and rotatable therewith, an engine normally in deactivated condition, clutch means for connecting said flywheel to said engine, control means responsive to the flow of electrical power from said supply source and arranged to actuate said clutch means and said switch means upon cessation of said flow of electrical power, said engine being accelerated by the stored-up energy of said flywheel until operating speed is reached whereupon said engine drives said alternator to supply current to said transmission line, and engine speed adjusting means coupled to said normal supply source and to the output of said alternator, said adjusting means comprising a pair of synchronous motors one of which is energized by said supply source and the other of which is energized by said alternator, differential drive means connected to the rotor shafts of said motors and operable to vary the speed of said engine in accordance with the difference in frequency of said supply source and said alternator, whereby said alternator may be synchronized with said supply source prior to deactuating said switch means.

17. An auxiliary power system adapted to supply electrical current to a load upon failure of the normal power supply source, comprising, in combination, an alternator, circuit means arranged to connect said alternator to a transmission line carrying alternating current from the normal supply source to a load, said alternator being arranged to function as a motor when said transmission line is supplied with alternating-current power from the normal supply source and arranged to function as a generator to supply current to said transmission line upon cessation of power from said supply source, switch means arranged when actuated to disconnect said transmission line from said normal supply source, a flywheel connected to said alternator and rotatable therewith, a source of motive power normally in deactivated condition, clutch means for connecting said flywheel to said source of motive power, control means responsive to the flow of electrical power from said supply source and arranged to actuate said clutch means and said switch means upon cessation of said flow of electrical power, said source of motive power being accelerated by the stored-up energy of said flywheel until operating speed is reached whereupon said source of motive power drives said alternator to supply current to said transmission line, speed adjusting means coupled to said normal supply source and responsive to the frequency of alternating current produced thereby, said adjusting means being arranged to vary the speed of said source of motive power so as to tend to synchronize the outputs of said alternator and said supply source prior to deactuating said switch means, and time delay means for controlling said switch means to assure that said switch means are not deactuated until said speed adjusting means has been operating for a predetermined period of time.

18. An auxiliary power system adapted to supply electrical current to a load upon failure of the normal electrical power supply source, comprising, in combination, an alternator having a field coil, circuit means arranged to connect said alternator to a transmission line carrying alternating current from the normal electrical supply source to a load, said alternator being arranged to function as a motor when said transmission line is supplied with alternating-current power from the normal supply source and arranged to function as a generator to supply current to said transmission line upon cessation of power from said supply source, an exciter for said alternator and including a field coil and an armature winding, means for connecting said armature winding to said alternator field coil, a pair of circuits selectively activatable for connecting said exciter armature to said exciter field coil, one of said circuits including a manually-adjustable resistor to control the exciter field current, the other of said circuits including voltage-responsive means for controlling the exciter field current, said voltage-responsive means being coupled to the output of said alternator, a flywheel connected to said alternator and rotatable therewith, a source of motive power normally in deactivated condition, clutch means for connecting said flywheel to said source of motive power, control means responsive to the flow of electrical power from said supply source and arranged to actuate said clutch means upon cessation of said flow of electrical power, said source of motive power being accelerated by the stored-up energy of said flywheel until operating speed is reached whereupon said source of motive power drives said alternator to supply current to said transmission line, and operating means arranged to activate said one exciter field circuit when said transmission line is supplied with power from the normal supply source and to activate said other exciter field circuit when said alternator supplies current to said transmission line.

References Cited in the file of this patent

UNITED STATES PATENTS

| | | |
|---|---|---|
| 2,302,192 | Dannheiser | Nov. 17, 1942 |
| 2,476,086 | Dorey | July 12, 1949 |
| 2,567,636 | Cuny | Sept. 11, 1951 |
| 2,688,704 | Christenson | Sept. 19, 1954 |
| 2,783,393 | Lindahl et al. | Feb. 27, 1957 |

FOREIGN PATENTS

| | | |
|---|---|---|
| 721,933 | Great Britain | Jan. 12, 1955 |
| 733,739 | Great Britain | July 20, 1955 |